United States Patent [19]
Gibbs et al.

[11] Patent Number: 5,197,220
[45] Date of Patent: Mar. 30, 1993

[54] CHANGEABLE FISHING LINE ATTACHMENTS

[75] Inventors: Louie W. Gibbs, Clermont; Michael D. Kelly, Groveland, both of Fla.

[73] Assignee: Classic Manufacturing Co., Inc., Clermont, Fla.

[21] Appl. No.: 874,691

[22] Filed: Apr. 28, 1992

[51] Int. Cl.⁵ .................. A01K 95/02; A01K 85/00
[52] U.S. Cl. ............................ 43/42.09; 43/42.36; 43/44.9
[58] Field of Search .......... 43/44.9, 42.36, 42.09, 43/44.91, 44.93, 42.08

[56] References Cited

U.S. PATENT DOCUMENTS

| | | | |
|---|---|---|---|
| 676,724 | 6/1901 | McCargar et al. | |
| 1,986,441 | 1/1935 | Koepke | 43/49 |
| 2,230,456 | 2/1941 | Henze | 43/52 |
| 2,474,498 | 6/1949 | Schwabe | 43/44.91 |
| 2,582,619 | 1/1952 | Bolckinger | 43/44.9 |
| 2,741,067 | 4/1956 | Cox | 43/44.9 |
| 3,273,278 | 9/1966 | Lynch | 43/44.87 |
| 3,800,459 | 4/1974 | Fleischaker | 43/44.9 |
| 4,163,337 | 8/1979 | Kress | 43/42.36 |
| 4,472,903 | 9/1984 | Hutson | 43/44.91 |
| 4,615,136 | 10/1986 | Bank | 43/44.91 |
| 4,635,392 | 1/1987 | Wirkus | 43/44.9 |
| 4,644,681 | 2/1987 | Hutson | 43/44.91 |
| 4,656,777 | 4/1987 | Fernbach | 43/44.9 |
| 4,691,468 | 9/1987 | Fernbach | 43/44.9 |
| 4,964,236 | 10/1990 | Adams | 43/44.92 |
| 5,031,351 | 7/1991 | Rogel | 43/44.9 |

Primary Examiner—Richard K. Seidel
Assistant Examiner—Jeanne M. Elpel
Attorney, Agent, or Firm—Charles M. Kaplan

[57] ABSTRACT

Multipart fishing tackle includes a first tackle member such as a sinker or a lure body that can be removed from a fishing line and replaced by another tackle member of different size, shape, color or density without untying a knot or severing the line.

21 Claims, 1 Drawing Sheet

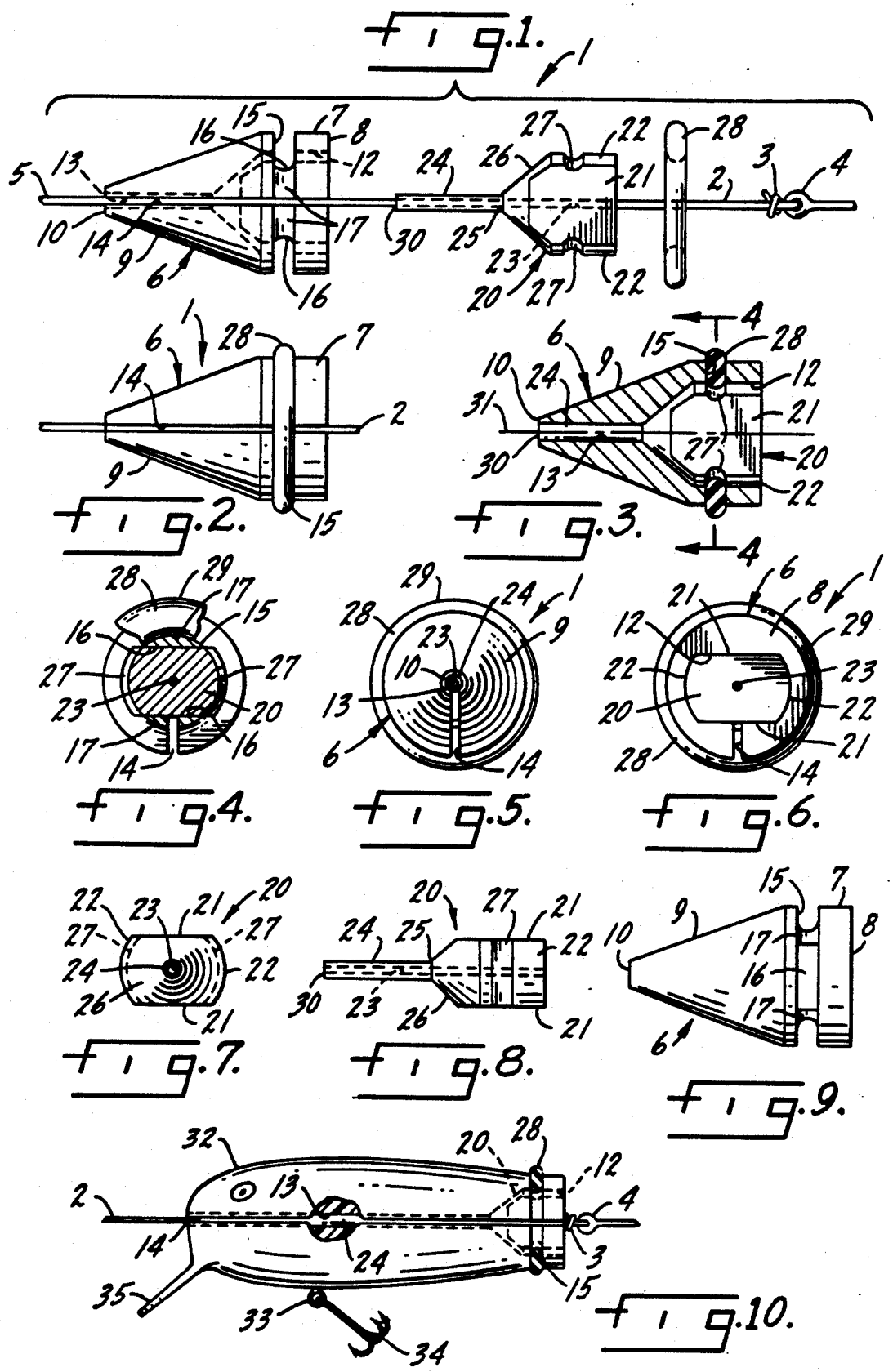

5,197,220

CHANGEABLE FISHING LINE ATTACHMENTS

BACKGROUND OF THE INVENTION

Our invention relates to fishing tackle and more particularly to fishing line attachments such as sinkers and lures that can be removed from a fishing line without having to untie a knot or cut the line and tie a new knot. When fishing conditions change, it is often advantageous for a fisherman using a sinker or lure on the line to change the size, shape or color of the tackle. However, fishermen sometimes neglect to change their tackle because making the change would require that the line be cut and a new knot tied. Tying knots in fishing line is often difficult when adverse conditions such as poor light or extreme cold are encountered out of doors, and fishermen with disabilities such as arthritis frequently have great difficulty tying knots in monofilament line. Prior attempts to supply fishermen with fishing tackle that can be changed without the necessity of tying a new knot have not been satisfactory because the prior tackle might injure the fishing line, or had parts that could be easily be lost or damaged, or were difficult or cumbersome to use.

OBJECTIVES OR THE INVENTION

Accordingly, it is an object of our invention to provide improved changeable fishing tackle.

Another object is to provide a fishing sinker having a weight that can be replaced by another weight having a different size, shape, or color without untying a knot or cutting a line and tying a new knot.

A further object is to provide a multi-part fishing line attachment having parts that remain on the fishing line and a part can be easily removed from the line and replaced with a different part.

Another object is to provide a fishing lure having a body that can be replaced by another body having a different action, shape, or color without untying a knot or cutting a line and tying a new knot.

Another object is to provide fishing tackle such as slip sinkers and plug bodies with interchangeable parts that can be used with a large variety of different sized fishing lines and which do not deform or otherwise damage the fishing line upon which they are used.

Another object is to enable a fisherman to switch back and forth between fishing live bait and fishing with artificial lures without having to tie knots.

Another object is to provide fishing tackle that can be easily changed under adverse conditions and by people with disabilities without requiring special skills or tools, that are snag resistant and easily used for casting and trolling, and which do not possess defects found in similar prior art changeable tackle.

Other objects and advantages of our invention will be found in the specification and claims, and the scope of the invention will be set forth in the claims.

DESCRIPTION OF THE DRAWING

FIG. 1 is a side view of a sinker in accord with our invention showing the parts separated.

FIG. 2 is a side view of the invention showing the parts assembled.

FIG. 3 is a side view corresponding to FIG. 2 showing the weight and ring in cross section.

FIG. 4 is a cross sectional view taken generally along the line 4—4 in FIG. 3.

FIG. 5 is a top plan view of the invention.
FIG. 6 is a bottom plan view of the invention.
FIG. 7 is a top plan view of the insert.
FIG. 8 is a side view of the insert.
FIG. 9 is a side view of the weight.
FIG. 10 is a partially cross sectional side view of another embodiment of the invention.

DESCRIPTION OF THE INVENTION

The drawing shows multi-part changeable fishing tackle such as sinker 1 for attachment to a fishing line 2 that has one terminal end tied in a knot 3 to the eye 4 of another piece of fishing tackle such as a hook or lure. The other end 5 of the line ordinarily would go to a fishing reel where the rest of the line is wound. The sinker 1 includes a first tackle member or changeable weight 6 that has a cylindrical section 7 that begins at one end 8, and a conical section 9 that tapers to its other end 10. Weight 6 has an internal cavity 12 that opens out of end 8 and a longitudinal cylindrical bore 13 through its center. Bore 13 begins at end 10 and merges into cavity 12, and the bore and cavity provide a continuous passageway through the weight. A continuous slit 14 through the side of weight 6 extends from end 8 to end 10 and the slit opens into bore 13 and cavity 12. Weight 6 has a circumferential groove 15 around the external periphery of section 7. Groove 15 overlaps cavity 12 and has a pair of identical holes 16 through its bottom that communicate with cavity 12 so as to expose the inside of the cavity. The center of each hole 16 is located about ninety degrees from slit 14. The portions of section 7 on opposite sides of groove 15 are connected by sections 17 that define the bottom surface of groove 15.

A removable second tackle member or insert 20 is shaped to fit into cavity 12. Insert 20 has a pair of opposed flat sides 21, a pair of opposed circular sides 22 and a longitudinal circular passage 23 through its center. The flat sides 21 and the coresponding flat surfaces of cavity 12 make it impossible for insert 20 and weight 6 to turn or rotate relative to each other when the insert is in the cavity. A hollow cylindrical tube 24 is aligned with and defines a continuation of passage 23. Tube 24 provides hollow cylindrical means protruding from one end 25 of insert 20, and is dimensioned to be received into bore 13. Tube 24 may be integral with insert 20 or may be a separate tube that is friction fit or otherwise secured in passage 23. Insert 20 tapers conically at 26 toward end 25 where the insert and tube merge. Insert 20 has a grooved portion 27 in the outer periphery of each curved side 22. Grooved portions 27 are shaped to mate with the bottom surface of groove 15 so that grooved portions 27 define continuations of groove 15 when insert 20 has been inserted into cavity 12 and tube 24 is in bore 13.

An flat-sided, resilient, flexible, circular ring or washer 28 provides removable means for holding insert 20 and weight 6 together. The washer 28 is dimensioned so that it can be stretched or rolled over section 7 into groove 15 where it will contact groove 15 and the grooved portions 27 of insert 20 exposed through holes 16. A portion 29 of the washer should extend or bulge out of groove 15 to aid in removal of the washer.

The diameter of bore 13, tube 24, passage 23, and the size of slit 14 should be large enough to permit the sizes of monofilament line used by fishermen to move freely therein, so that sinker 1 can slide easily along line 2. The eye 4 should be larger than passage 23 so that it acts as a stop holding the insert 20 in line 2. Weight 6 and insert 20 can be made from metal and preferably from an environmentally safe metal such as brass. It is also possible to make insert 20 from a hard plastic such as ABS, and to predetermine its density so that insert 20 can be made to float or to sink in water.

To attach sinker 1 to a fishing line 2, an end of the line is first passed through tube 24 and out of passage 23, then through washer 28, and then tied in a knot 3 to a part 4 of the fishing tackle being used by the fisherman. The insert and washer should be separated along the line at this time. A length of the line 2 on the side of insert 20 away from the knot 3 may then be passed through the slit 14 into bore 13 and cavity 12 in weight 6. Insert 20 should then be inserted into cavity 12 and tube 24 into bore 13. The length of tube 24 should be sufficient that the terminal end 30 of the tube extends all the way to the end 10 of the weight. This enables tube 24 and insert 20 to completely close slit 14, and thus prevent weight 6 from falling off line 2. Grooved portions 27 of the insert and groove 15 are now aligned through holes 16, so washer 28 can be rolled over section 7 of the weight into groove 15. The washer frictionally engages groove 15 and grooved portions 27 so as to hold the parts together with insert 20 inside of weight 6. When the parts are assembled in this manner, the central axes of weight 6, insert 20 and washer 28 are coincident, as indicated at 31.

Weight 6 can be removed and replaced with a weight of different size, shape or color without untying knot 3 or cutting line 2 and tying a new knot. To accomplish this, washer 28 should be removed from groove 15 and rolled off the weight. The insert 20 can then be taken out of cavity 12 and tube 24 out of bore 14. This opens slit 14 and permits weight 6 to be taken off line 2. A different weight having a bore 13, slit 14 and cavity 12 identical to those of the first weight can now be placed on line 2, through its slit, and the preceeding steps repeated to attach the new weight to the line.

FIG. 10 shows another embodiment of changeable fishing tackle in accord with this invention that is identical to the embodiment of FIGS. 1-9, except that the first member is a changeable fishing lure plug body 32 having an eye 33 for attaching a swingable treble hook 34 to the lure and a diving vane 35. The body 32 has a slit 14 for receiving fishing line 2 and an internal cavity 12 and bore 13 for receiving the tube 24 and grooved insert or second member 20 that remains on the line. The lure body 30 and insert 20 are held together by a washer 28 that fits into a peripheral groove 15 around the plug body and the grooved portion 27 of the insert, in the manner previously described.

The eye 4 tied by knot 3 to the terminal end of line 2 may be part of a fishing hook or another piece of tackle that provides a stop at the end of passage 23 for holding the lure on the line. Plug body 30 may be made from any suitable material such as plastic or wood. The relationship between the density of plug body 30 and the density of insert 20 can be varied when the bodies 30 are changed so that the lure can be made to sink or to float in water.

The lure body 30 can be removed and replaced with a lure body having a different size, shape, color, action, or density without cutting line 2 or tying a new knot in the same manner described above with reference to FIGS. 1-9. Briefly, the washer 28 would be removed from the groove 15 in body 30, and the insert 20 and body 30 would then be moved apart until they are completely separated. The line 2 would be removed through slit 14 in body 30, with line 2 continuing to pass through washer 28 and the passage 23 in insert 20. The line 2 would be passed into the slit 14 of a different body 30, and the insert 20 and body 30 would be assembled as previously described, and the washer 28 would be placed in the groove 15 and grooved portion 27 as before.

The change of fishing tackle members described herein can be easily accomplished under adverse weather and light conditions without the use of tools. The parts of sinker 1 or lure 30 do not rotate relative to each other and will not crimp or abrade line 2. The unique manner in which the members are made interchangeable permits sinker 1 and lure body 30 to be shaped so that they can be trolled or cast effectively without excessive snagging. Since insert 20 and washer 28 remain on the line at all times, the number of parts that can be lost or misplaced is reduced. The cavities 12 and bores 13 on different types of fishing tackle can be made the same size and shape. Thus, when eye 4 is the eye of a fish hook, it is possible for a fisherman to replace a plug body 30 with a weight 6, and then to put an artificial worm or live bait such as a minnow or earthworm on his line without tying a new knot.

While the present invention has been described with reference to a particular embodiment, we do not intend to illustrate herein all of the equivalent forms or ramifications thereof. For example, an O-ring having a circular cross section could be used in place of flat-sided washer 28 if the shape of groove 15 and grooved portion 17 were changed to fit the O-ring. Also, the words used are words of description rather than limitation, and various changes may be made without departing from the spirit or scope of our invention disclosed herein. We intend that the appended claims cover all such changes as fall within the true spirit and scope of our invention.

We claim:

1. Changeable fishing tackle for attachment to a fishing line, comprising:
   A. first member having an internal cavity and a circumferential groove around said cavity in the outer periphery of said first member, there being a hole through said groove exposing said cavity through said groove;
   B. a second member shaped to fit into said cavity, said second member having a grooved portion in its outer periphery, said grooved portion being aligned with said hole so as to expose said grooved portion through said hole when said second member is in said cavity;
   C. removable means for holding said first and second members together when said removable means is placed in said groove so as to contact said grooved portion of said second member; and
   D. there being an access passage in said second member for threading said fishing line through said second member, said fishing line being freely movable through said access passage.

2. The fishing tackle defined in claim 1, wherein said removable means comprises a circular ring.

3. The fishing tackle defined in claim 1, wherein said second member has a flat side and an arcuate side, and said grooved portion is in the periphery of said arcuate side.

4. The fishing tackle defined in claim 1, wherein said grooved portion of said second member defines a continuation of said groove in said first member when said second member is in said cavity.

5. The fishing tackle defined in claim 1, wherein said first member has a bore through its center and a slit through its outer surface communicating with said bore and said cavity, and said slit providing an access passage for placing said fishing line into said first member.

6. Changeable fishing tackle for attachment to a fishing line, comprising:
   A. a first member having an internal cavity and a circumferential groove around said cavity in the outer periphery of said first member, here being a pair of holes through said groove on opposite sides of said cavity, each of said holes exposing said cavity through said groove;
   B. a second member shaped to fit into said cavity, said second member having a pair of grooved portions in its outer periphery, each of said grooved portions being aligned with one of said holes so as to expose said grooved portions through said holes when said second member is in said cavity, said grooved portions forming continuations of said groove when said second member is in said cavity; and
   C. removable means for holding said first and second members together when said removable means is placed in said groove so as to contact said groove portions of said second member.

7. Changeable fishing tackle for attachment to a fishing line, comprising:
   A. a first member having an internal cavity and a circumferential groove around said cavity in the outer periphery of said first member, there being a hole through said groove exposing said cavity through said groove;
   B. a second member shaped to fit into said cavity, said second member having a grooved portion in its outer periphery, said grooved portion being aligned with said hole so as to expose said grooved portion through said hole when said second member is in said cavity;
   C. removable means for holding said first and second members together when said removable means is placed in said groove so as to contact said grooved portion of said second member; and
   D. means for attaching said fishing tackle to said fishing line comprising said second member having a longitudinal opening through which its central axis passes, and said opening providing an access passage for threading said fishing line through said second member.

8. Changeable fishing tackle for attachment to a fishing line, comprising:
   A. a first member having an internal cavity and a circumferential groove around said cavity in the outer periphery of said first member, there being a hole through said groove exposing said cavity through said groove;
   B. a second member shaped to fit into said cavity, said second member having a grooved portion in its outer periphery, said grooved portion being aligned with said hole so as to expose said grooved portion through said hole when said second member is in said cavity;
   C. removable means for holding said first and second members together when said removable means is placed in said groove so as to contact said grooved portion of said second member; and
   D. means for attaching said fishing tackle to said fishing line comprising said first member having a bore through its center communicating with said cavity and a slit through its outer surface communicating with said bore and said cavity, said slit providing an access passage for placing said fishing line into said bore and said cavity, said second member having a longitudinal opening through which its central axis passes, said opening providing an access passage for threading said fishing line through said second member, means protruding from an end of said second member, and said protruding means extending into said bore and closing said slit when said second member is in said cavity.

9. Changable fishing tackle for attachment to a fishing line, comprising:
   A. a first member having an internal cavity, there being a longitudinal bore through the center of said first member, said bore communicating with said cavity;
   B. a second member shaped to fit into said cavity and having a longitudinal opening through which its central axis passes, said opening providing an access passage for threading said fishing line through said second member, hollow means protruding from an end of said second member and providing an extension of said longitudinal opening, said protruding means extending into said bore, so as to attach said first member to said fishing line when said second member is in said cavity; and
   C. means for holding said first and second members together comprising said first member having a circumferential groove in its external surface around said cavity, there being a hole through said groove exposing said cavity, said second member having a grooved portion in its outer periphery, said grooved portion of said second member being exposed through said hole, and removable means in said groove for contacting said grooved portion of said second member so as to hold said first and second members together.

10. The fishing tackle defined in claim 9, wherein said first member has a longitudinal slit through its outer surface, said slit communicating with said bore and said cavity, said slit providing an access passage for placing said fishing line into said first member.

11. The fishing tackle defined in claim 10, wherein said protruding means closes said slit when said second member is in said cavity.

12. The fishing tackle defined in claim 9, wherein said protruding means comprises a cylindrical tube.

13. The fishing tackle defined in claim 12, wherein said tube is integral with said second member.

14. The fishing tackle defined in claim 12, wherein said end of said second member tapers toward said tube.

15. The fishing tackle defined in claim 9, wherein said removable means comprises a circular ring.

16. Changeable fishing tackle for attachment to a fishing line comprising:
   A. a hollow first tackle member having a longitudinal cylindrical bore through its center, said cylindrical bore beginning at one end of said first tackle member and merging into an internal cavity at the other end of said first tackle member, said cavity providing an opening at said other end, there being a continuous slit extending from said one end to said other end, said slit communicating with said cylindrical bore and said cavity, said first tackle member having a circumferential groove around its exterior periphery, said groove overlapping said cavity, there being a hole in said groove communicating with said cavity and exposing said cavity through said groove;

B. an insert shaped to fit into said cavity, said insert having longitudinal passage through its center, and hollow cylindrical means aligned with said passage, said cylindrical means protruding from one end of said insert, said cylindrical means extending into said bore, said insert having a grooved portion in its outer periphery, said grooved portion being shaped to mate with said circumferential groove of said first tackle member;

C. a resilient, flexible, circular ring dimensioned to be receivable in said grooved portion of said insert and said circumferential groove of said first tackle member;

D. said cylindrical bore, said slit, said cylindrical means and said passage being dimensioned to receive said fishing line and to permit said fishing line to move freely therein;

E. said fishing line being passed through said circular ring and through said passage and said cylindrical means of said insert, and said fishing line being passed through said slit into said bore and said cavity of said first tackle member, said insert being inserted into said cavity with its cylindrical means extending into said bore so as to close said slit and its grooved portion being aligned with said groove of said first tackle member, and said circular ring then being placed into said aligned groove and grooved portion to hold said insert inside of said first tackle member;

F. whereby, said first tackle member can be removed from said line and replaced by another similar tackle member without untying or severing said line by removing said circular ring from said groove, and then removing said insert from said first tackle member so as to take said cylindrical means out of said bore and thereby to open said slit so that said line can be passed through said slit out of said first tackle member, and a similar tackle member can be attached to said fishing line by passing said line through its slit, inserting said insert into its cavity with its cylindrical means in the bore of said similar tackle member and placing said circular ring in its groove.

17. The fishing tackle defined in claim 16, wherein said first tackle member has a pair of holes in said groove on opposite sides of said first tackle member that expose said cavity through said holes, said insert has a pair of opposite flat sides and a pair of arcuate sides, said flat sides preventing relative turning of said first tackle member and insert, said insert has a grooved portion in each of said arcuate sides, the grooved portions of said insert defining continuations of said groove in said first tackle member through said pair of holes, and said circular ring is flat-sided and is dimensioned to extend out of said groove beyond said exterior periphery of said first tackle member.

18. The fishing tackle member defined in claim 16, wherein said cylindrical means comprises a cylindrical tube and said one end of said insert tapers toward said tube.

19. The fishing tackle member defined in claim 18, wherein said tube is integral with said insert.

20. The fishing tackle defined in claim 16, wherein said first tackle member is a fishing sinker.

21. The fishing tackle defined in claim 16, wherein said first tackle member is a fishing lure body.

* * * * *

UNITED STATES PATENT AND TRADEMARK OFFICE
CERTIFICATE OF CORRECTION

PATENT NO. : 5,197,220
DATED : March 30, 1993
INVENTOR(S) : Louie W. Gibbs, et al It is certified that error appears in the above-indentified patent and that said Letters Patent is hereby corrected as shown below:

Column 4, line 42, ---a--- should be inserted after "first"

Signed and Sealed this

Twenty-fifth Day of January, 1994

Attest:

BRUCE LEHMAN

Attesting Officer    Commissioner of Patents and Trademarks